No. 721,901. PATENTED MAR. 3, 1903.
A. C. LEMON.
DUMPING WAGON.
APPLICATION FILED APR. 17, 1902.
NO MODEL.
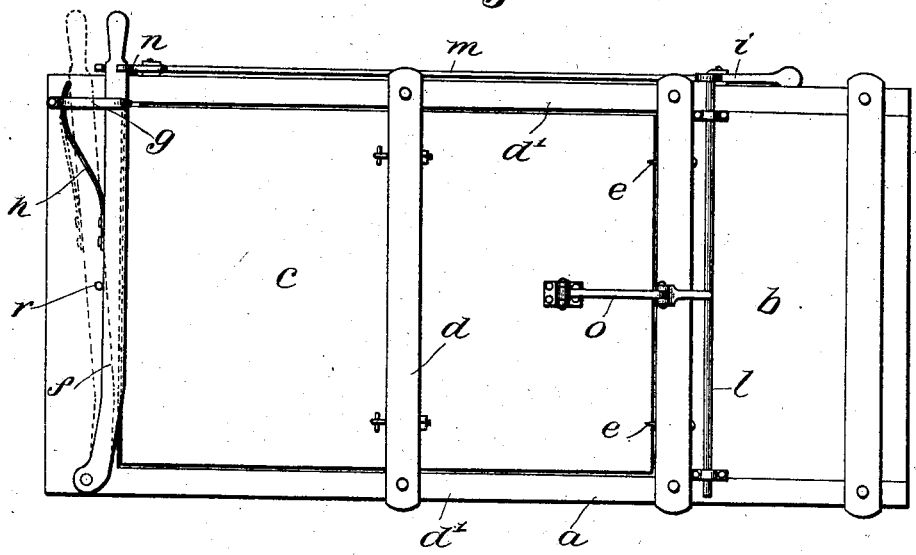
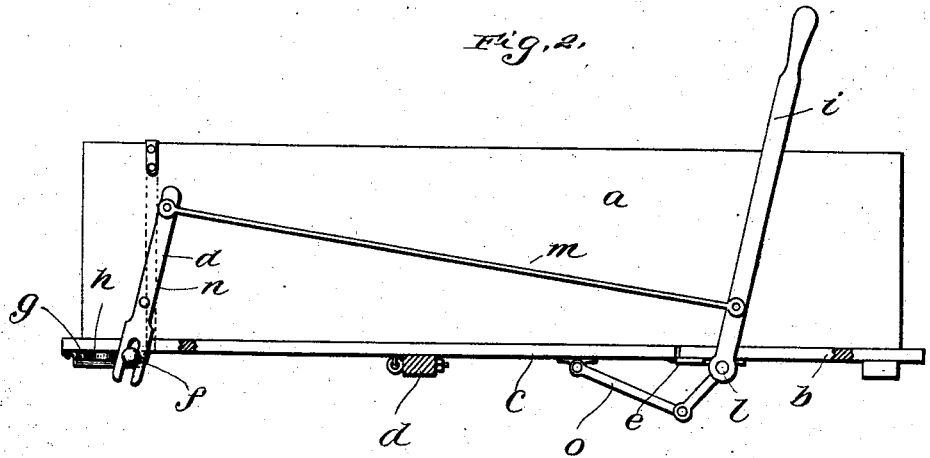
Witnesses:
Albert Popkins,
Geo. M. Copenhaver.
Inventor:
Abby C. Lemon
by William F. Hall
Atty.

UNITED STATES PATENT OFFICE.

ABBY C. LEMON, OF ROANOKE, VIRGINIA, ASSIGNOR TO WILLIE J. LEMON, OF ROANOKE, VIRGINIA.

DUMPING-WAGON.

SPECIFICATION forming part of Letters Patent No. 721,901, dated March 3, 1903.

Application filed April 17, 1902. Serial No. 103,340. (No model.)

*To all whom it may concern:*

Be it known that I, ABBY C. LEMON, a citizen of the United States, residing at Roanoke, in the county of Roanoke and State of Virginia, have invented certain new and useful Improvements in Dumping-Wagons, of which the following is a specification, reference being had therein to the accompanying drawings.

My invention relates to an improvement in dumping-wagons; and the object thereof is to provide a simple and consequently a cheaply-constructed dumping mechanism which may be readily applied to wagons and which will be effective in operation.

To this end the invention includes a wagon-body having a pivoted bottom section provided with an intermediate hinge-support and a removable pivoted support for one end of said section.

The invention further includes means for releasing said pivotal support adapted to be operated from the driver's seat; and it also includes means for positively tilting the pivoted section when said support is removed.

The invention also includes the details of construction, as will be hereinafter described, and particularly pointed out in the claims.

While the invention is susceptible of many modifications, which will readily suggest themselves, I have illustrated in the accompanying drawings and will hereinafter describe what I now conceive to be the preferred embodiment thereof.

As shown in the drawings, Figure 1 is a bottom plan view of a wagon-body embodying my invention, and Fig. 2 is a side elevation of a wagon-body embodying the invention.

As shown in the accompanying drawings, the wagon-body is indicated at $a$ and is provided with a bottom consisting of a rigid portion $b$ and a hinge rear section $c$. The section $c$ is intermediately supported upon and hinged to a bar $d$, extending across the bottom of the wagon and bolted to the side frames $d'$. One end, preferably the forward end, of the section $c$ finds a support upon fixed stops or rests $e$, projecting from the rear edge of the portion $b$, while the opposite or rear end of the section $c$ finds a support upon a pivoted arm $f$. The latter arm is pivoted at one end near one edge of the side frame $d'$, while its other end, which projects beyond the opposite edge of the wagon, is free and provided with a suitable operating-handle. The free end of the arm $f$ is guided in a bracket $g$, secured to the frame of the wagon-bottom, and it is normally pressed, by means of a leaf-spring $h$, beneath the rear edge of the section $c$. In this position said section is supported at one edge upon the stops $e$, at its central point upon the bar $d$, and at its rear edge upon the arm $f$, and the bottom of the wagon is consequently closed and ready to receive the load to be placed thereon.

To dump the wagon, the arm $f$ is drawn back by means of its handle to remove the same from beneath the rear edge of the section $c$, when the latter may be tilted upon its hinge connection to dump the load.

To provide means to shift the arm $f$ which may be operated from the driver's seat, I have provided an operating-lever $i$, secured to a cross-rod $l$, journaled to the section $b$, and this lever is connected by a link $m$ to a second pivoted lever $n$, having its lower end connected to the arm $f$. By shifting the lever $i$ the lever $n$ is likewise shifted through the medium of the link $m$ and the arm $f$ moved back and forth.

To positively tilt the section $c$ when the supporting-arm $f$ is removed from beneath the same, I have provided a pushing member, which consists of a link $o$ pivotally connected to the section $c$, near the forward end of the same, at one end and to a radial arm extending from the rod $l$ at its other end. Thus as the lever $i$ is shifted the rod $l$, to which the same is rigidly connected, is rocked, and through the medium of the radial arm extending therefrom the link $o$ is pushed upwardly and the section $c$ positively tilted upon the bar $d$. It will thus be apparent that I have provided an exceedingly simple dumping mechanism which may be readily applied to the ordinary wagon without requiring any great reconstruction of the latter, it being only necessary to provide a hinge bottom section and to apply the other mechanism to the bottom frame of the wagon-body.

To prevent the arm f from being accidentally moved from beneath the edge of the pivoted section c or by an unauthorized person, such as a mischievous boy, I provide a suitable locking-pin, which is guided in an opening r in one of the frame members of the bottom of the body, said pin being adapted to rest behind and in contact with the pivoted member f.

I claim—

1. The combination with a wagon-body having a pivoted bottom section of a bar forming an intermediate support therefor extending from side to side of the wagon bottom and bolted to the frame thereof, an arm providing a support for one end of the pivoted section, said arm being pivoted at one end to the frame of the bottom and having its free end extended beyond the side of the wagon, and provided with a handle a bracket forming a guide and support for the said free end and a spring secured to said arm finding a bearing upon said bracket, said spring being adapted to normally hold the arm beneath the edge of the pivoted section.

2. The combination with a wagon-body having a pivoted bottom section of a pivoted supporting-arm therefor, means for shifting said arm from the driver's seat, including a lever arranged adjacent to said seat, a cross-rod having said lever rigidly secured to the same and means for positively tilting said pivoted section, comprising an arm extending radially from said cross-bar and a link pivotally connected at one end thereto at its opposite end to the pivoted bottom section.

In testimony whereof I affix my signature in presence of two witnesses.

ABBY C. LEMON.

Witnesses:
HENRY E. COOPER,
WILLIAM F. HALL.